(12) United States Patent
Haas et al.

(10) Patent No.: US 9,259,008 B2
(45) Date of Patent: Feb. 16, 2016

(54) METHOD AND APPARATUS FOR MAKING A HOLLOW BAKED PRODUCT

(75) Inventors: Johannes Haas, Vienna (AT); Josef Haas, Leobendorf (AT); Stefan Jiraschek, Koenigsbrunn (AT); Fritz Obermaier, Krems (AT)

(73) Assignee: HAAS FOOD EQUIPMENT GMBH, Vienna (AT)

( * ) Notice: Subject to any disclaimer, the term of this patent is extended or adjusted under 35 U.S.C. 154(b) by 543 days.

(21) Appl. No.: 13/556,239

(22) Filed: Jul. 24, 2012

(65) Prior Publication Data

US 2013/0029014 A1  Jan. 31, 2013

(30) Foreign Application Priority Data

Jul. 25, 2011 (AT) .................................. A 1086/2011

(51) Int. Cl.
*A21D 13/00* (2006.01)
*A21C 15/02* (2006.01)

(52) U.S. Cl.
CPC .......... *A21D 13/0029* (2013.01); *A21C 15/025* (2013.01); *A21D 13/008* (2013.01)

(58) Field of Classification Search
CPC . A21D 13/0029; A21D 13/008; A21C 15/025
USPC ............. 99/352–354; 425/404; 426/138, 512, 426/514, 389, 499
See application file for complete search history.

(56) References Cited

U.S. PATENT DOCUMENTS

| 4,624,855 | A | 11/1986 | Haas |
| 4,694,741 | A | 9/1987 | Haas |
| 7,754,268 | B2 | 7/2010 | Haas |
| 2008/0087151 | A1* | 4/2008 | Lin .................................. 83/78 |

FOREIGN PATENT DOCUMENTS

| DE | 10005500 A |   | 8/2001 |
| GB | 222018 A | * | 9/1924 |
| WO | WO 8900008 A | * | 1/1989 |
| WO | 9933348 A |   | 7/1999 |

\* cited by examiner

*Primary Examiner* — Jianying Atkisson
(74) *Attorney, Agent, or Firm* — Andrew Wilford

(57) ABSTRACT

A hollow body is made from a flat baked wafer cake by first juxtaposing the wafer cake with a cavity of a deep-drawing mold and then forming edge regions of the cake with a plurality of deformations out of a plane of the cake at a uniformly spacing around a periphery of the cake. Then the cake is pushed by a deep-drawing punch into the cavity to it into a hollow body and to form each of the deformations into a multilayer fold.

6 Claims, 11 Drawing Sheets

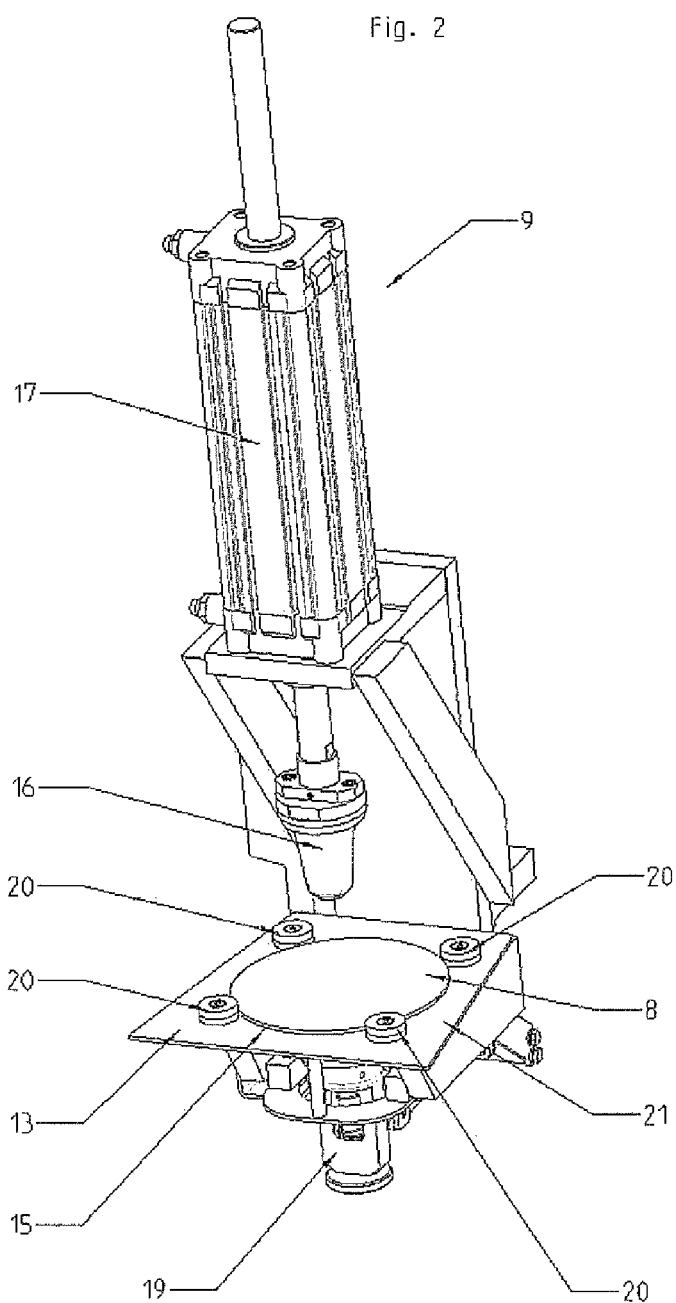

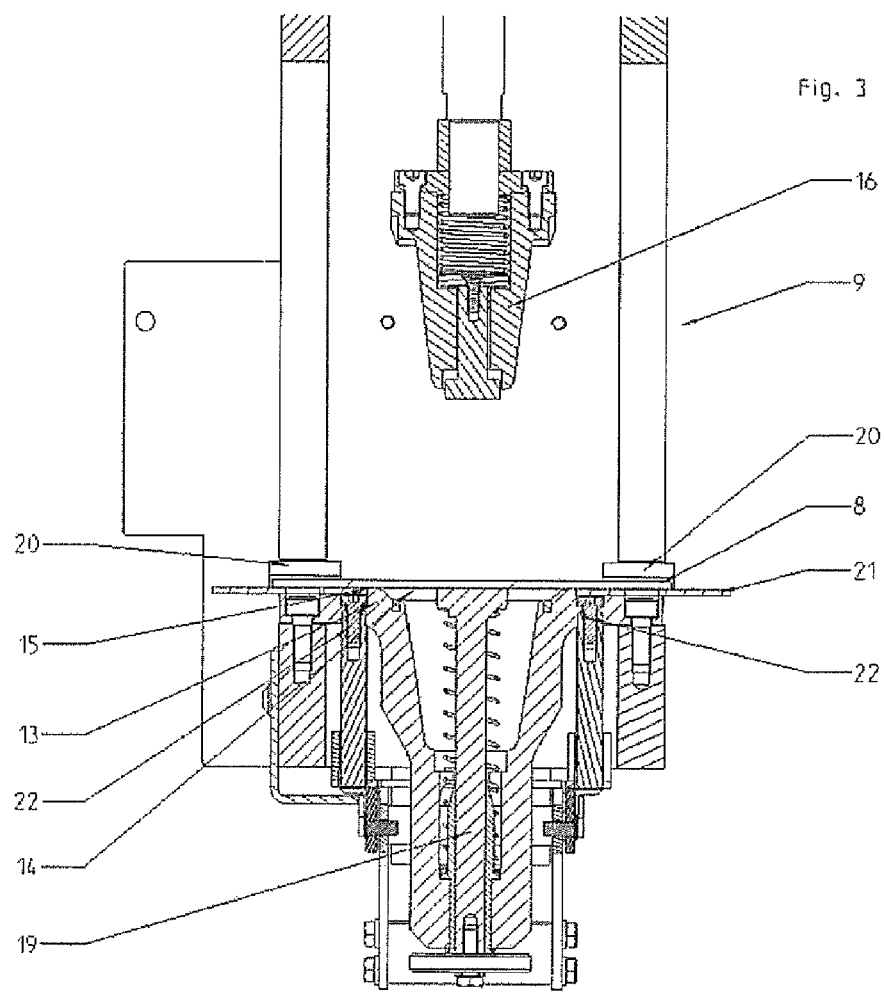

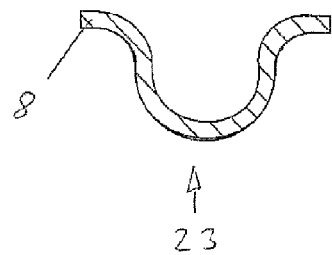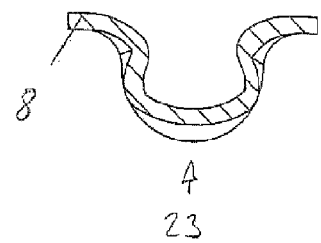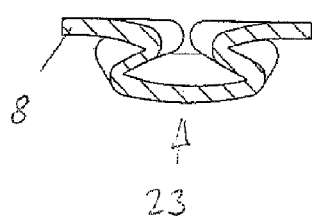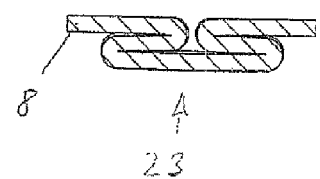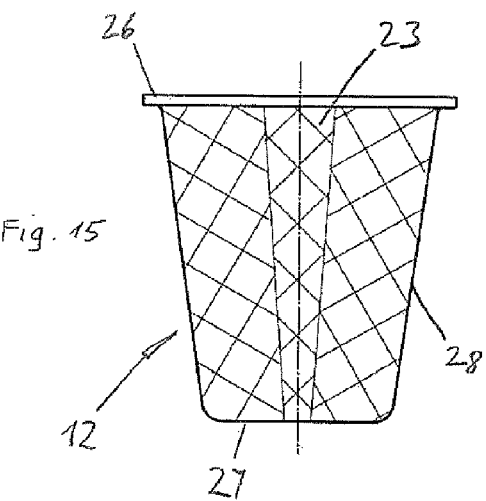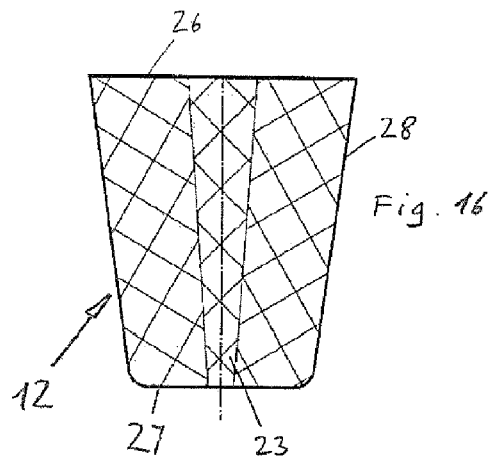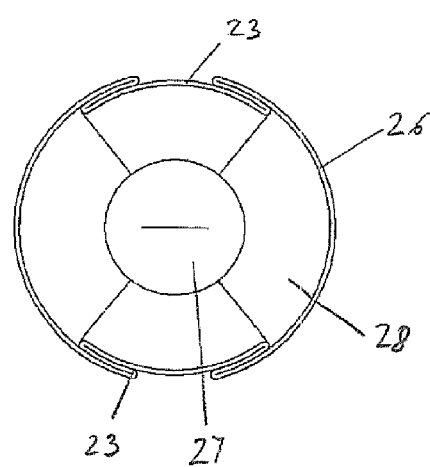

METHOD AND APPARATUS FOR MAKING A HOLLOW BAKED PRODUCT

FIELD OF THE INVENTION

The present invention relates to the manufacture of a baked wafer product. More particularly this invention concerns a method of and apparatus for making a hollow baked product such as an ice-cream cup or cone.

BACKGROUND OF THE INVENTION

It is known to make a hollow baked product from an edible, baked flat wafer cake that can be shaped when hot and that has a rigid cup shape during and/or after the shaping process, normally when it has cooled. More particularly, the hollow baked product is at least partially formed from a fluent bakable batter for long-life bakery products made of flour and/or starch, preferably dough and bakable batter being used as disclosed, for example, in U.S. Pat. No. 7,754,268. The simple method of baking a flat wafer piece is combined with the possibility of plasticizing it at or just below baking temperature through the melted sugar content so as to be able to easily mechanically reshape it, but then to let the sugar solidify through simple and rapid cooling and thus to stabilize the obtained shape. This results in a brittle, hard product. At room temperature, these wafers substantially consisting of a starch-sugar (sugar substitute)-protein mixture are below the glass transition temperature. Moreover, the sugar portion is mostly solidified as a glassy melt and therefore has a particularly crisp texture.

Typical sugar contents for rolled ice cream cones are, for example, 30 to 50% by weight based on flour, or 60 to 100% in the case of hollow wafer sticks.

Methods and apparatuses for shaping wafer-like long-life bakery products are also known and, accordingly, can also be found in patent literature, for example in U.S. Pat. No. 4,624,855 and U.S. Pat. No. 4,694,741 that describe an apparatus and a method for making rolled, preferably conical hollow wafers usable as ice-cream cones. In the thus produced individual wafers, in particular baked from a sugar-containing dough, in the soft and shapable state for baking, the flat wafer cakes are first rolled into a particular shape of the hollow wafers and are then solidified in this shape, where each flat wafer cake is first freely rolled into a predetermined shape of the hollow wafer, and then the finish-rolled hollow wafer is calibrated by plastically shaping edge regions to a predetermined longitudinal extension of the hollow wafer, and subsequently, the calibrated hollow wafer solidifies.

These rolled cones have proven themselves in practice due to their properties such as, for example, stability, appearance, haptics, processability, ease of filling, etc. and are therefore one of the most common wafer-like hollow body shapes.

An alternative apparatus for making a wafer product is shown in DE 10 005 500. Here, substantially flat wafer product is deep drawn so that side walls are formed that are preferably perpendicular opposite each other in the upper region, the wafer product being created by using a shaping punch and pressing a substantially flat wafer piece into a corresponding hollow mold, and where the upper edge of the preferably perpendicularly opposing side walls of the deep-drawn wafer product are cut to be flush. The also disclosed production method is comparable to the shaping method of die forging. After the baking process, the wafer sheet is pressed in the hot and therefore shapable state by a punch into a die and is squeezed between these two elements.

Another method for shaping an edible hollow container from wafer dough is shown in WO 1999/033348. Here, an also flat wafer sheet is drawn by means of a punch into a die. Due to the shapes, in particular the proportions between the circumference of the baked flat wafer cake and the circumference of the opening of the finished hollow container, bulging can occur in the region of the opening.

In practice, experience has shown that it can be desirable to provide edible, hollow baked products, in particular edible hollow containers from wafer-like dough or baked substances, with reinforcement ribs so as to positively influence their physical properties. However, implementing ribs with the above-described production methods is limited in that after solidifying, thicker areas have different physical properties and, for example become soft or too hard. Nevertheless, in order to provide thicker regions in wafer products, it is therefore advantageous to configure these regions in a multilayer manner. Forming folds during a deep-drawing process is one possibility to achieve this multilayer arrangement.

The disadvantage of the prior art is that it is not possible to provide specific structures with multilayer regions in hollow, baked products or edible hollow containers such that the structures have improved stability, appearance, physical properties, crispness, eating experience and sound during consumption, etc.

OBJECTS OF THE INVENTION

It is therefore an object of the present invention to provide an improved method and apparatus for making a hollow baked product.

Another object is the provision of such an improved method and apparatus for making a hollow baked product that overcomes the above-given disadvantages, in particular that overcomes the disadvantages of the prior art and, in addition, that is inexpensive in terms of production, flexible in terms of shaping, flexible in terms of controlling the fold structure, and that can be produced efficiently.

SUMMARY OF THE INVENTION

A hollow body is made from a flat baked wafer cake by first juxtaposing the wafer cake with a cavity of a deep-drawing mold and then forming edge regions of the cake with a plurality of deformations out of a plane of the cake at a uniformly spacing around a periphery of the cake. Then the cake is pushed by a deep-drawing punch into the cavity to it into a hollow body and to form each of the deformations into a multilayer fold.

Furthermore, the present invention is characterized in an advantageous manner in that the flat wafer cake is positioned over the deep-drawing cavity and is bulged at the folds by lifters of the preshaping device opposite to the holding force from a substantially planar shape into a shape that is bulged and preshaped in the folds, that the preshaped flat wafer cake is brought during the deep-drawing process from a shape that is bulged at the folds substantially into a cup shape, and/or that during the deep-drawing process, the bulged folds are first shaped to be Ω-shaped and are subsequently shaped so as to lie on top of each other in a multilayer manner.

According to further advantageous features, the flat wafer cake is round, oval, rectangular, polygonal, square, star-shaped or corresponds to any other shape in which the longitudinal extension exceeds the thickness a plurality of times, that during shaping, the flat wafer cake is given a shape with a controllable position of its folds, that the flat wafer cake is fed along the transfer surface to the deep-drawing cavity, is centered over the deep-drawing cavity by centering bosses, is preshaped by the preshaping device and is deep drawn by the punch into the deep-drawing cavity and in the course of these steps, and/or thereafter, is cooled and solidified and subsequently ejected by the ejector out of the deep-drawing cavity, and/or that the flat wafer cake is first positioned when planar on the deep-drawing ring over the deep-drawing cavity, is held there by a holding force, subsequently bulged opposite to the holding force and subsequently deep drawn into the deep-drawing cavity by the punch of the deep-drawing device.

Moreover, inventive features are that from a position outside of the deep-drawing cavity, the punch is at least partially inserted in a substantially straight line into the deep-drawing cavity thereby drawing the flat wafer cake into the deep-drawing cavity, and/or that the flat wafer cake consists of a dough or a baking mass that contains a plasticizer, in particular a temperature-dependent plasticizer such as, for example, sugar, erythrol and/or xylite.

The hollow baked product that is at least partially formed from an edible, baked flat wafer cake that can be shaped in the hot state and has a cup shape during and/or after the shaping process, is characterized in that the product has multilayer folds that are distributed around the circumference in a symmetrical, rotationally symmetrical and/or regular manner, that the main extension directions of the folds of the cake run substantially perpendicular to the rim of the cup toward the floor of the cup, that the folds are at least double-layered, preferably triple-layered, and/or that the folds follow the shape of the cup in a substantially close manner.

The invention further relates to an apparatus for making a hollow baked product, comprising a deep-drawing device with a deep-drawing cavity over which a baked, shapable and solidifiable flat wafer cake can be positioned, and with a punch that can be at least partially inserted by means of a punch actuator from a position outside of the deep-drawing cavity into the deep-drawing cavity, characterized in that a preshaping device for preshaping the flat wafer cake is provided in the region of the deep-drawing cavity, that the preshaping device has preshaping elements that are arranged in the region of the folds of the wafer cake and can preferably be extended toward the flat wafer cakes, a drawing ring being provided that substantially surrounds the deep-drawing cavity and on which the flat wafer cake is retained with a holding force, and/or that the drawing ring is parallel to or level with the transfer surface.

Further apparatus features according to the invention are that at least one centering boss for centering and/or positioning the flat wafer cake is provided over the deep-drawing cavity, that the centering bosses project above the drawing ring against the holding force, that the lifters can be brought from a retracted position in which they are substantially recessed in the transfer surface into an extended position in which they project above the drawing ring and/or that a drive is provided for moving the lifters.

It is to be noted that the designations deep-drawing cavity, drawing ring, round blank and punch are typical terms from the field of metal shaping. The use of these terms serves for clarity and better understanding of the patent application. However, these terms are under no circumstances to be interpreted as being limited to their common use in the field of metal shaping. For example, the mold called a deep-drawing mold here has a cavity in which the round blanks are deep drawn by the punch. Similar to a die, this deep-drawing mold can have a shaping function—but it does not have to. Thus, it depends on the volume of the deep-drawn round blank and the remaining volume between the fully inserted punch and the deep-drawing mold if the round blank is squeezed in the resulting gap or is freely deep drawn so that the round blank does not rest against the deep-drawing mold. Through suitable selection of the shape of the punch and the deep-drawing mold, shape and surface of the edible hollow body can be determined. By providing an embossing punch or a relief in the deep-drawing mold or on the punch, for example, the wafer body can be embossed with a particular structure. During free deep drawing, thus without large-area surface contact or squeezing on the deep-drawing mold, the grid-shaped surface embossing of the baking tongs of the baking oven is maintained.

Also, the designation round blank is not limited to round, thin flat-cake-like bodies made of baking masses or dough goods for long-life bakery goods. Thus, it also in accordance with the inventive idea to select rectangular, oval, star-shaped, polygon-shaped, flat wafer-shaped or other blank shapes. Preferably, the round blank is formed as a flat wafer cake.

BRIEF DESCRIPTION OF THE DRAWING

The above and other objects, features, and advantages will become more readily apparent from the following description, reference being made to the accompanying drawing in which:

FIG. 2 is a perspective detail view of the preshaping device for making the edible body according to the invention in a starting or first position A;

FIG. 3 is a vertical section through part of the preshaping device for making the edible body, also in the starting position;

FIGS. 11 to 14 are schematic end views of part of the rim of the round blank during succeeding steps of shaping with the desired fold shape;

FIG. 15 is a side elevational view of a hollow baked product according to the invention;

FIG. 16 is a side elevational view of another embodiment of a baked hollow body according to the invention; and FIG. 17 is a top view from above with view into the cup of FIG. 16.

DETAILED DESCRIPTION

Figure 1A:
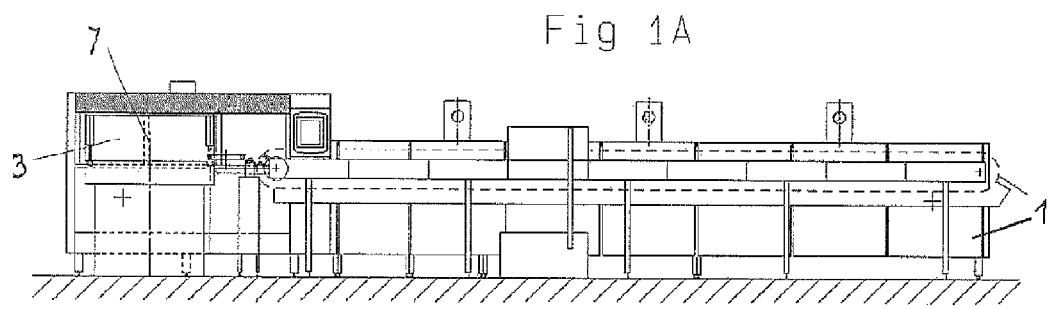
FIG. 1A is a small-scale side elevational view of a manufacturing facility for making edible bodies according to the invention.
Figure 1B:
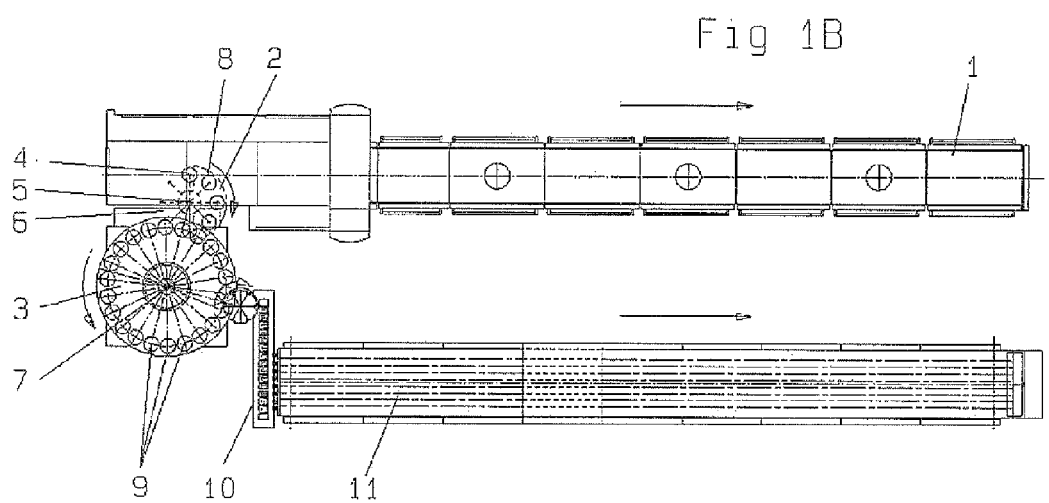
FIG. 1B is a small-scale top view of the system of FIG. 1A.

As seen in FIGS. 1A and 1B a wafer baking oven 1 has revolving baking tongs and an oven output station at which soft flat wafer cakes, that is round blanks, are removed by the individually opening baking tongs and transferred from a device 2 to a preshaping device 3. Here, this transfer is carried out by grippers 4 that can orbit about a rotation axis 5 of the transfer device 2, that engage the flat wafer cakes from above, and that subsequently feed them with a rotary movement about the rotation axis 5 along a substantially horizontally transfer surface 6 to the preshaping device 3. The preshaping device 3 has at least one, preferably a plurality of deep-drawing devices such as shown in FIGS. 2-10 that are mounted on a carousel rotatable about a vertical axis 7. The speed of the revolving baking tongs and the angular speeds of the transfer device 2 and the preshaping device 3 are synchronized in such a manner that when a baking tong opens, the soft and still shapable flat wafer cake 8 or round blank is received by the transfer device 2 and is fed with a synchronous rotational movement to the preshaping device 3, specifically each fed to a revolving deep-drawing device 9. Here, the absolute average speed of the flat wafer cake on the transfer device 2 is higher than the speed of the flat wafer cake on the deep-drawing device 9.

As further shown in FIGS. 1A and 1B, during rotation of the flat wafer cake 8 on the preshaping device 3 about the axis 7, the flat wafer cake 8 is deep drawn with the method steps described below. The method steps conform to first through fifth positions A, B, C, D, E that are preferably assumed in this order. At the end of the shaping method, that is after fifth step E, the deep-drawn edible body—the hollow baked product—is transferred from an intake device 10 to a reconditioning device 11. The intake device 10 has a rotatable intake unit 10 that lines the baked products up into a straight row. Subsequently, the straight row of baked products is fed substantially perpendicular to its longitudinal extent to the reconditioning device. Therein, the edible bodies can for example be pre-cooled, greased and finally cooled, or can also be provided with a coating, for example of chocolate.

FIGS. 2 and 3 show the deep-drawing/deep-drawing device 9 according to the invention in the first position A in which a punch 16 movable by a punch actuator 17 is in a raised position spaced from the soft flat wafer cake 8. The flat wafer cake 8 is positioned outside a deep-drawing mold 13 or its deep-drawing cavity 14 defined by a drawing ring 15.

As mentioned in the description of FIGS. 1A and 1B, the flat wafer cake 8 coming from the baking oven 1 is fed by a transfer device 2 to the deep-drawing device 9. For positioning the flat wafer, centering bosses 20 are provided that project from a support face 21 of the preshaping device 3 in order to be able to serve as stops and center the flat wafer cake over the deep-drawing cavity 14. Apart from the illustrated cylindrical embodiment, it is also possible to shape the stopper elements differently, for example as recesses in the support face 21 or stop rails and the like. In this embodiment, four coin-shaped or cylindrical bosses 20 are provided. Using a smaller number of them can have advantages with respect to transporting the flat wafer cake 8. Thus, in this or in another embodiment, the support face 21 of the deep-drawing device 9 can be flush with the transfer surface 6, the round blank 8 being slid over both surfaces 6 and 21 and stripped off at the centering bosses 20 serving as stopper elements by the gripper 4. When using four centering bosses, the transfer surface 6 is above the support face 21 of the deep-drawing device 9 by a certain amount, preferably by the height of the centering bosses 20. In this manner, the flat wafer cake is slid over the centering bosses and then positioned by gravity over the deep-drawing mold opening and then deposited centered between the centering bosses 20.

As further shown in FIGS. 2 and 3, the flat wafer cake 8 positioned over the deep-drawing cavity 14 is lying on the drawing ring 15 of the deep-drawing device 9. This drawing ring 15 is level with the transfer surface 6 of the preshaping device 3. The flat wafer cake 8 is retained by gravity that here is parallel to the actuation direction 18 of the punch actuator 17. In a different or alternative configuration, the flat wafer cake 8 can also be held by centrifugal forces that act outwardly when the preshaping device 3 rotates. Furthermore, it is also a feature of the invention, apart from acceleration forces due to gravity or acceleration due to centrifugal force, to hold with low-pressure devices, or with mechanical holders and the like.

In the first position A, the basically planar wafer cake lies flat on the drawing ring 15 over the deep-drawing cavity 14 and accordingly over the deep-drawing mold 13. The term "over" refers to the schematic view as shown in FIG. 2. In practice it happens that due to the low stiffness of the flat wafer cake, sagging into the deep-drawing cavity 14 occurs. Although in the course of this, the flat wafer cake 8 partially projects into the deep-drawing cavity 14, for improving clarity and simplicity, this is understood to be covered by the term "over" the deep-drawing cavity.

Actuating the punch actuator for moving the punch 16 in its actuation direction 18 is done in this embodiment by a pneumatic arrangement such as, for example, a linear pneumatic cylinder. Of course, it is within the scope of the invention to carry out this linear movement by hydraulic, electric or mechanical actuators such as, for example, hydraulic cylinders, linear motors, linear drives, cam systems, etc.

FIG. 3 shows the flat wafer cake 8 positioned on the drawing ring 15 over the deep-drawing cavity 14 and the deep-drawing mold 13. The punch 16 and the punch actuator are in the first position A, thus in a raised position. Furthermore, an ejector 19 is illustrated that, in this embodiment, is configured as an elastically prestressed punch and is in a raised position. Lifters 22 are completely recessed in the support face 21.

Figure 4:
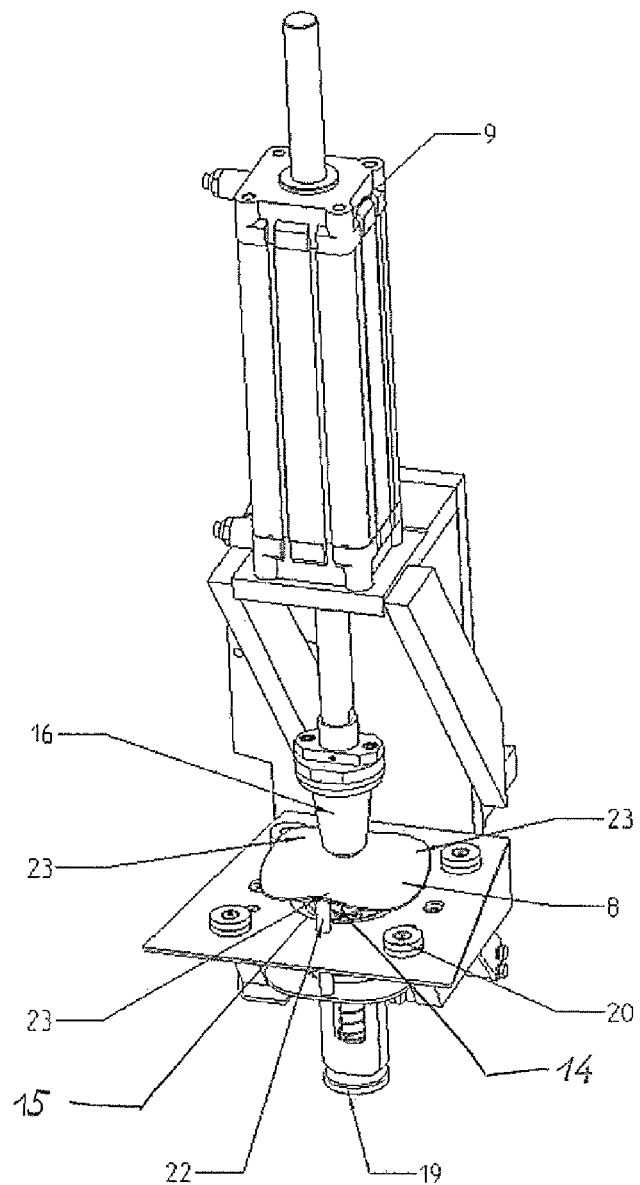
FIG. 4 is a perspective view of the preshaping device in a second position.
Figure 5:
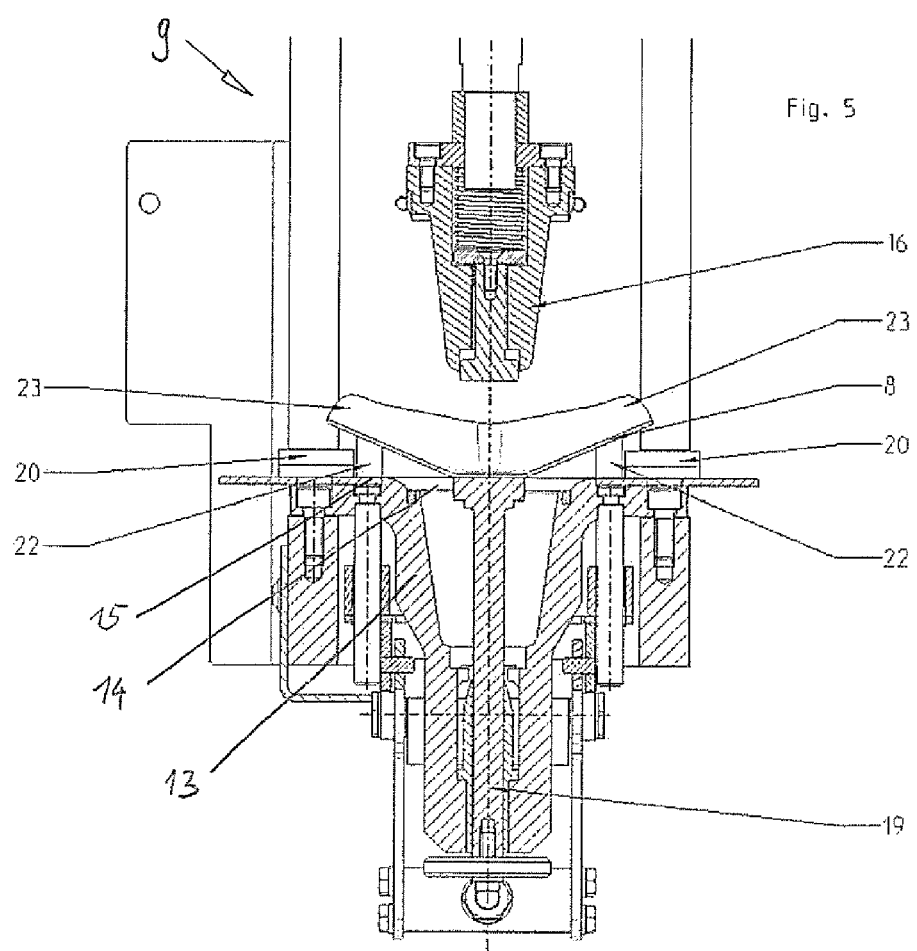
FIG. 5 is a vertical section through part of the preshaping device in the second position.

FIGS. 4 and 5 show the preshaping device 3 in the second position B. Here, the lifters 22 are extended against a holding force in such a manner that they project above the support face 21 and give the flat wafer cake a shape that has multiple upward bulges, preshaping the cake 8 with folds 23. Thus, the flat wafer cake is converted from a substantially planar shape into a shape that has multiple bulges. During bulging or also after bulging is completed, the punch 16 itself can be moved toward and into the deep-drawing cavity 14.

Figure 6:
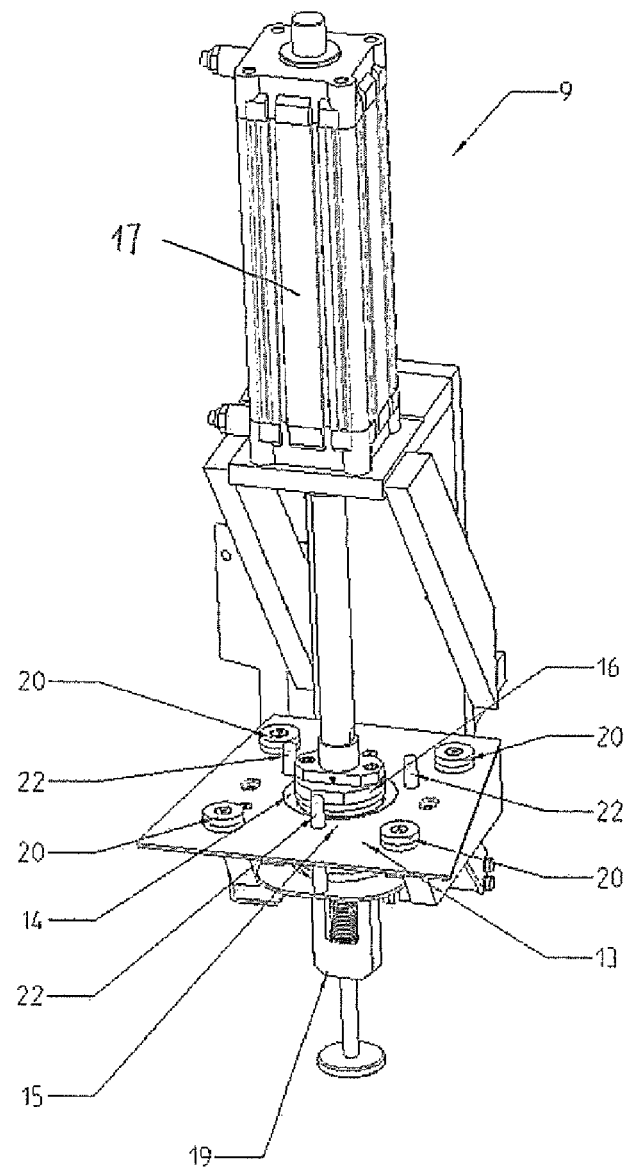
FIG. 6 is a perspective view of the preshaping device in a third position.
Figure 7:
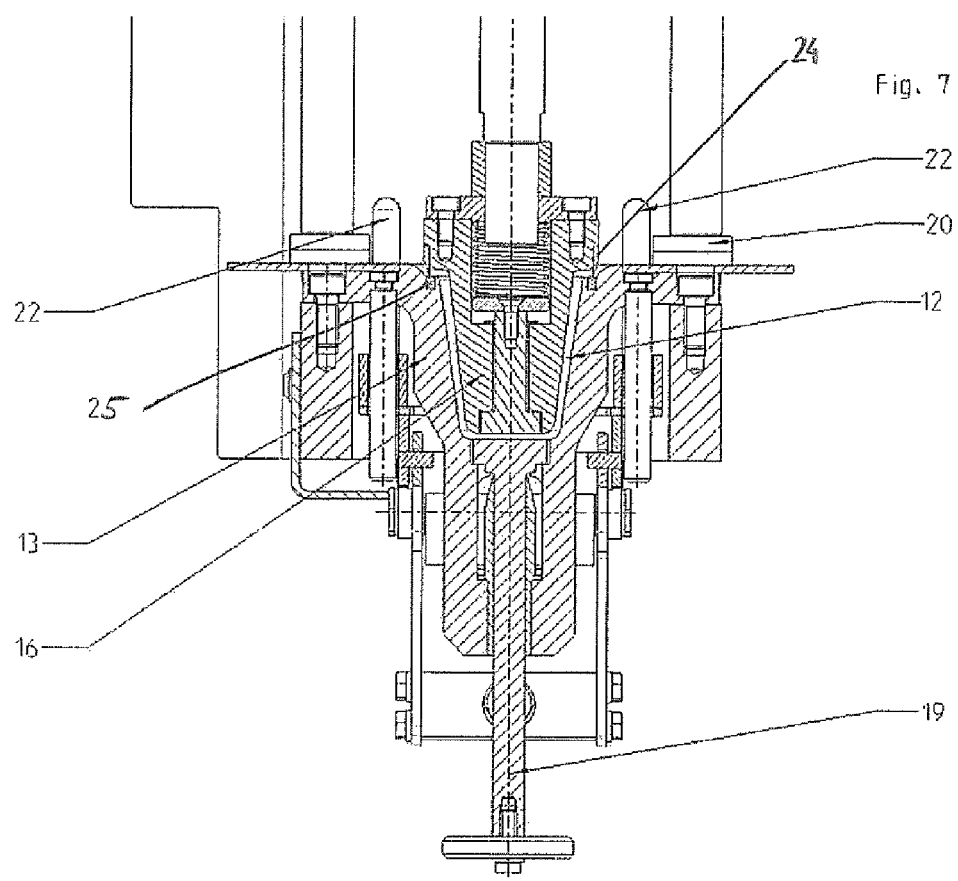
FIG. 7 is a vertical section through part of the preshaping device in the third position.

FIGS. 6 and 7 show the deep-drawing device 9 in the third position C. The punch 16 is pushed by its actuator 17 into the deep-drawing cavity 14 and through the drawing ring 15 into the deep-drawing mold 13. Similar to a deep-drawing process, the round blank or the flat wafer cake 8 is drawn by this action into the deep-drawing mold 13. Thus the flat wafer cake 8 is formed into a cup 12 between the punch 16 and the deep-drawing mold 13. The spring-loaded ejector 19, which is mounted so as to be guided in the actuation direction of the punch actuator, is pushed by the punch 16 from an extended or raised position shown in FIGS. 2-5, into a prestressed recessed position.

Optionally, a cutting arrangement interacting with a cutting ring 24 can be provided for interaction with the drawing ring in order to cut off the overhang of the flat wafer cake 8 at a rim 26 (FIGS. 15-17) of the formed cup 12. To this end, the punch 16 is provided with a cutting ring 24 that interacts with a stop ring 25. When moving the punch into the deep-drawing cavity, the cutting ring 24 is pressed with its cutting edge against the ring 25. With the present geometry, the flat wafer cake 8 is cut off along the edge of the cutting ring 24.

It is to be noted that in the present form, a circularly annular cutting ring 24 is provided. However, it is absolutely in accordance with the inventive idea to make the cutting ring oval, rectangular or star-shaped or to shape it following any conceivable shape, in particular following any conceivable closed contour.

Insertion of the punch 16, pretensions the ejector 19. The force of the punch is effective through the flat wafer cake for tensioning a biasing element of the ejector 19 to push this ejector 19 against the force of its biasing spring into the illustrated lowermost position.

Figure 8:
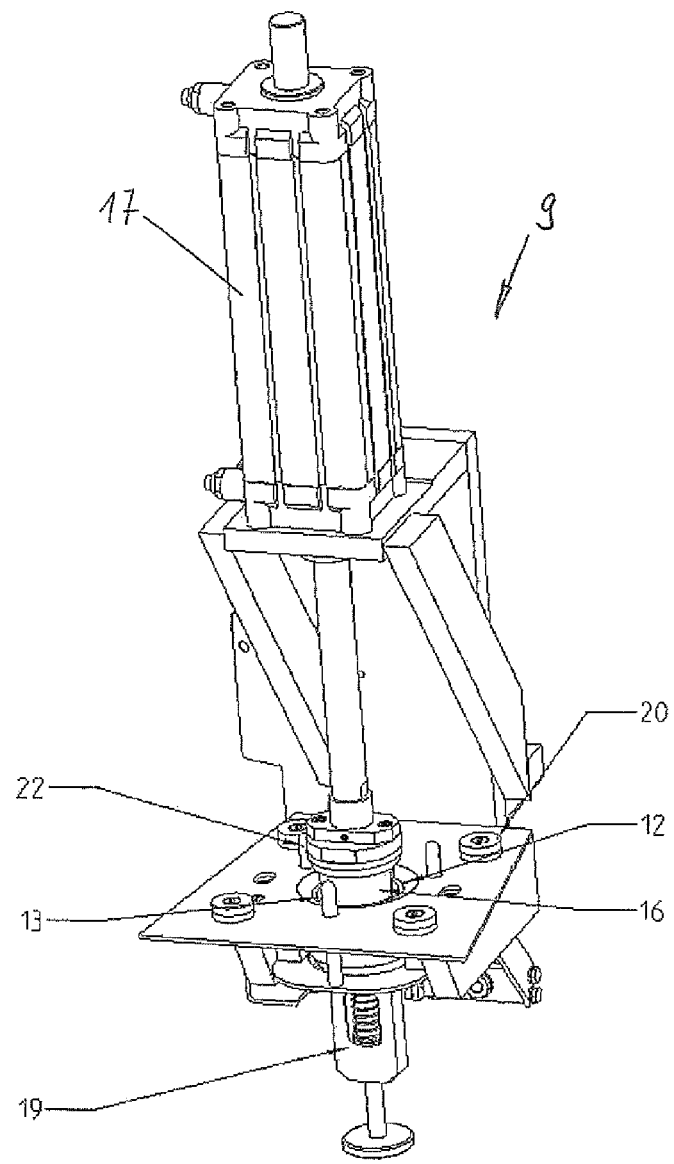
FIG. 8 is a perspective view of the preshaping device in a fourth position.

FIG. 8 shows the device 9 in the fourth position D in which the punch 16 is retracted upward out of the deep-drawing mold 13. The elastically biased ejector 19 moves synchronously up with the punch 16 and pushes the finished baked product 12 or edible body that is formed from the flat wafer cake 8 and is now cup-shaped and at least partially solidified and dimensionally stable with the punch 16 out of the deep-drawing mold 13. As this happens, the deep-drawn flat wafer cake formed into the product 12 maintains the desired cup shape.

Figure 9:
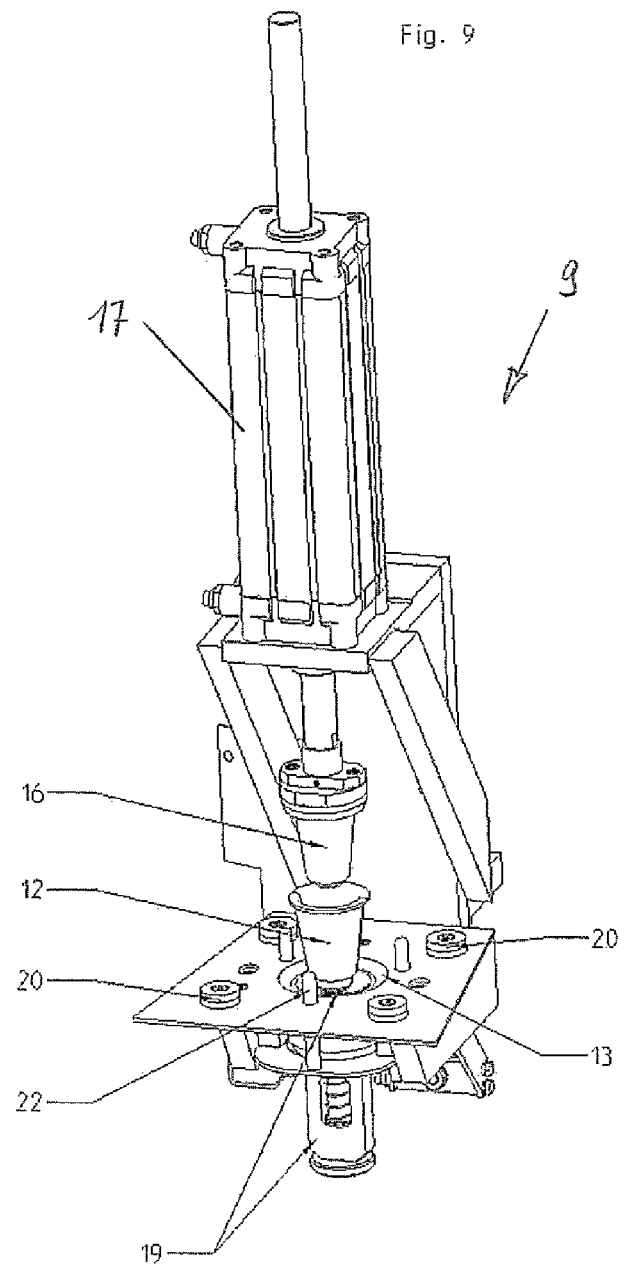
FIG. 9 is a perspective view of the preshaping device in a fifth position.
Figure 10:
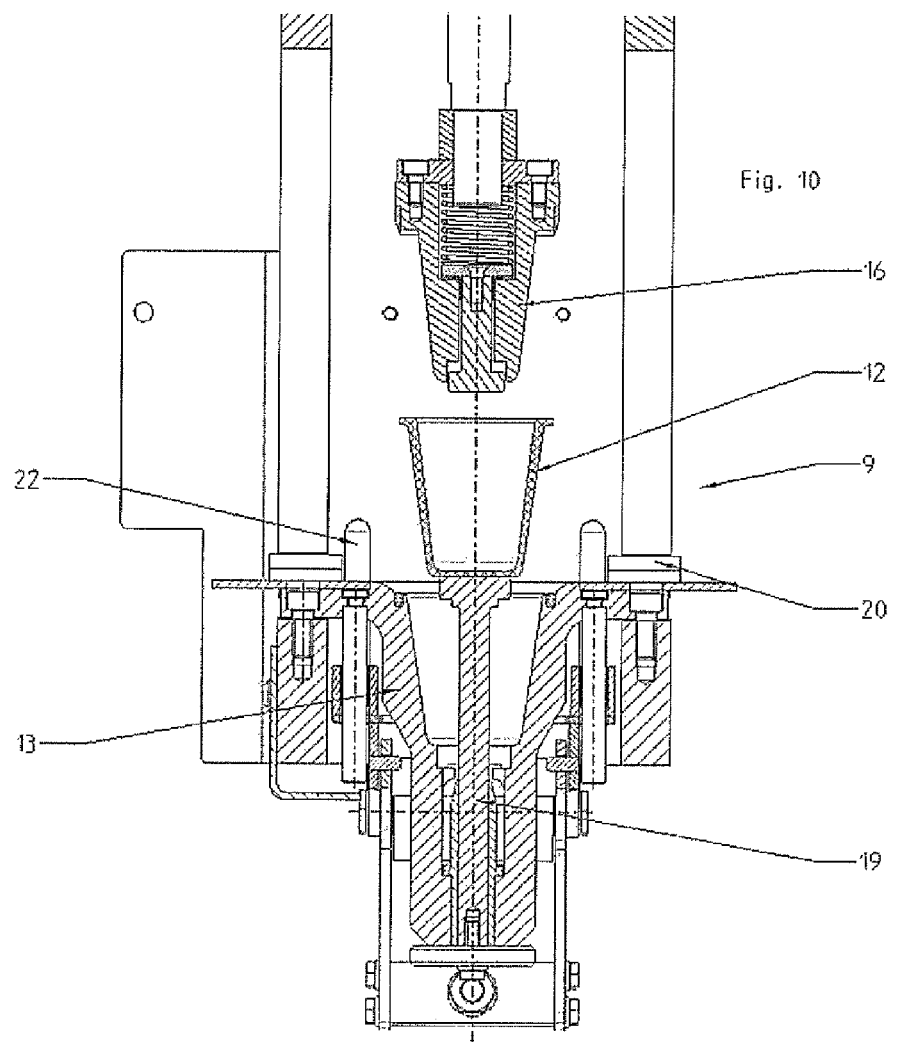
FIG. 10 is a vertical section through the preshaping device in the fifth position.

FIGS. 9 and 10 show the apparatus in the final or fifth position E with the punch 16 retracted upward completely out of the finished cup 12 and the ejector 19 holding this cup 12 above the plane of the top face of the mold 13.

During the deep-drawing movement according to the invention as illustrated, for example, in FIGS. 2-9, of folds are formed on the flat wafer cake or the hollow baked product takes place due to geometrical and physical conditions. As mentioned above, the formation of folds 23 is desired and provides the finished product with a number of advantageous properties.

The formation of the folds is illustrated in detail in FIGS. 11 to 14. These figures show a vertical section through a segment, in particular of the fold 23 of the edge of the flat wafer cake that, after the shaping according to the invention, corresponds in the finished state to the rim 26 of the hollow baked product 12. Bulging by the lifters 22 (see FIG. 4) gives the flat wafer cake 8 a shape that enables and/or facilitates the formation of the folds 23 at the desired positions. Here, three lifters 22 are provided so that folds 23 are created in three regions of the flat wafer cake 8.

At the beginning of the deep-drawing process, these bulges that eventually form the folds 23 are slightly bulged upward against the deep-drawing direction, and the flat wafer cake 8 extends substantially perpendicular to this vertical deep-drawing direction. As the punch 16 moves down in the deep-drawing cavity 14 and the deep-drawing mold 13, the flat wafer cake 8 is formed into the cup 12. Side walls 28 of the cup 12 are deformed here from the initial position toward the deep-drawing punch 16. Since the circumference of the flat-lying flat wafer cake 8 is larger than the circumference of the finished cup 12, the desired formation of folds takes place in particular in the region of the cup rim 26, but also in a region near a cup floor 27. At the beginning of the deep-drawing movement, the folds 23 are Ω-shaped (omega-shaped) bulges, as shown in FIG. 11. With continued penetration and deep drawing of the flat wafer cake 8, these Ω-shaped bulges are more and more compressed, as illustrated in the FIGS. 12 and 13. Once the punch 16 is completely or almost completely moved into the deep-drawing mold 13, the desired fold shape according to FIG. 14 is formed. It is to be noted that this is a possible fold shape. Through suitable selection of the lifters 22, for example asymmetrical lifters, angular lifters, but also through the number of lifters, it is possible according to the inventive idea to achieve different fold shapes.

The fold shape as illustrated in FIG. 14, for example, imparts to the flat wafer cake a constant thickness during the baking process and forms the desired reinforced regions only through specific folding in the folds 23. If the lifters 22 were not provided, folds 23 would still be created; however, their positions would be at random so that the folds of each individual flat wafer cake would be generated at different positions. In is particular in mass production, this results in a high reject rate of wafer bodies caused by, for example, crack formation, irregular arrangement of folds, etc. With the present invention, selecting the position of the folds 23 is possible, that is they can be uniformly spaced in each cup 12 and identically spaced on all finished cups 12.

FIG. 15 shows an embodiment of a possible baked, deep-drawn product. It has the rim 26, the floor 27, the side wall 28 and the folds 23. Here, the rim 26 is formed such that it projects laterally in a plane. This collar-shaped or bent embodiment increases stability and strength of the rim 26.

FIG. 16 shows another embodiment of a cup-shaped baked product 12 according to the invention in a side view. Here, however it is also in accordance with the inventive idea to shape the baked product spherically, hemispherically, cylindrically, conically, cubically or cuboidally, etc. In addition here the rim 26 is not bent over and outwardly projecting, but has been cropped off very close to the side wall 28.

FIG. 17 is a view from above of an inventive baked product according to FIG. 16. As noted, the folds 23 are laid on top of each other multiple times. The present illustration is a schematic view. It can happen in practice that in particular the regions lying on top of each other in a multilayer manner are squeezed by the punch and that therefore the flat wafer cake is thinner in this region than in the remaining regions of the side wall 28. Thus, despite the multilayer arrangement in the folds, a constant total wall thickness along the entire side wall might exist.

Here of FIG. 17, two folds 23 are regularly distributed on the circumference. However, it is also in accordance with the is inventive idea to provide more than two, in particular three, four, five, six or more folds.

In the embodiments shown, the folds are bulged by the lifters 22. However, it is also within the meaning of the invention that no lifters extending opposite to the deep-drawing direction are used, but, for example, formations such as recesses or cutouts are provided in the region of the drawing ring 25 or in the region of the support face of the preshaping device 3. For example, in a further, unillustrated embodiment, cutouts are provided in the drawing ring and in the region of the deep-drawing cavity, into which cutouts regions of the soft round blank, in particular of the hot, shapable flat wafer cake 8 are drawn by gravity or other holding force prior to the deep-drawing process or during the deep-drawing process. This configuration too forms folds that result in the desired specific fold formation during the deep-drawing process.

It should be noted here that the invention is not limited to the above-described illustrated embodiments. Further embodiments in accordance with the inventive idea arise from combinations of individual or a plurality of features that can be found in the entire description, the figures and/or the claims. Thus, also such embodiments are disclosed that consist of combinations of features that originate from different illustrated embodiments. The figures are at least partially schematic views, dimensions and proportions deviating from further illustrated embodiments or features that are not graphically illustrated, as well as from real embodiments.

We claim:

1. An apparatus for making a hollow body from a flat baked wafer cake, the apparatus comprising:
    a deep-drawing mold having a planar upper face and an upwardly open cavity;
    means for juxtaposing the wafer cake with the cavity of the deep-drawing mold;
    a plurality of preshaping formations uniformly spaced around the cavity for forming edge regions of the cake with a plurality of respective deformations out of a plane of the cake at a uniform spacing around a periphery of the cake;

a punch engageable into the cavity; and actuator means for pushing the cake with the punch into the cavity and thereby deforming the cake into a hollow body and forming each the deformations into a multi-layer fold uniformly spaced around the hollow body.

2. The apparatus defined in claim 1, wherein an upper face of the mold is defined by a drawing ring.

3. The apparatus defined in claim 2, further comprising:
a transfer surface level with the ring; and
means for sliding the cake along the surface onto the ring.

4. The apparatus defined in claim 1, further comprising:
a plurality of centering bosses horizontally spaced on the die around the cavity such that the cake can fit between them over the cavity and projecting upward above an upper face of the die.

5. The apparatus defined in claim 1, wherein the preshaping formations are each formed by a respective lifter raisable above the upper face of the die around the cavity.

6. The apparatus defined in claim 5, further comprising:
means for raising the lifters above the die and thereby forming the deformations after the cake is juxtaposed with the die.

* * * * *